United States Patent

Henrick et al.

[15] 3,697,561

[45] Oct. 10, 1972

[54] NOVEL SULFUR CONTAINING DI AND TRI UNSATURATED ALIPHATIC CARBONYL COMPOUNDS

[72] Inventors: Clive A. Henrick; John B. Siddall, both of Palo Alto, Calif.

[73] Assignee: Zoecon Corporation, Palo Alto, Calif.

[22] Filed: April 5, 1971

[21] Appl. No.: 131,455

[52] U.S. Cl. ............. 260/399, 260/400, 424/312, 424/318

[51] Int. Cl. ............................. C08h 3/00, C08h 9/02
[58] Field of Search ..................... 260/399, 400, 402

*Primary Examiner*—Elbert L. Roberts
*Attorney*—Donald W. Erickson

[57] ABSTRACT

Novel sulfur containing di- and tri-unsaturated aliphatic carbonyl compounds prepared by ylid reaction or phosphonate carbanion reaction which are useful for the control of insects.

13 Claims, No Drawings

NOVEL SULFUR CONTAINING DI AND TRI UNSATURATED ALIPHATIC CARBONYL COMPOUNDS

This invention relates to novel unsaturated carbonyl compounds of formula A, the preparation thereof and the control of insects:

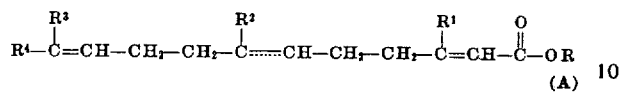

wherein,
R is hydrogen, lower alkyl, cycloalkyl, aralkyl or aryl; each of $R^1$ and $R^2$ is lower alkyl; $R^3$ is hydrogen or lower alkyl;
$R^4$ is one of the groups

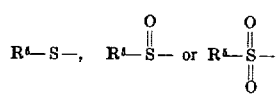

in which $R^5$ is lower alkyl; and the broken line indicates the presence or absence of a carbon-carbon bond.

The term "lower alkyl," as used herein, refers to an alkyl group, straight or branched, having a chain length of one to six carbon atoms. The term "cycloalkyl," as used herein refers to a cyclic alkyl group of four to eight carbon atoms. The term "aralkyl," as used herein, refers to a monovalent group of seven to twelve carbon atoms in which an aryl group is substituted for a hydrocarbon atom of an alkyl group, such as benzyl, mesityl, phenylethyl, methylbenzyl, naphthymethyl and naphthylethyl. The term "aryl," as used herein, refers to monovalent aryl group of six to 12 carbons, such as phenyl and naphthyl.

The compounds of formula A are useful insect control agents. For application, the insect control agents of the present invention are applied using a suitable carrier substance, liquid or solid, such as talc, silica, cellulose, synthetic and natural resins, water, acetone, xylene and mineral and vegetable oils. Generally, a formulation will contain less than 95 percent of the insect control agent and more frequently less than 25 percent. Sufficient application should be made to provide from about 0.1 to 50 micrograms of insect control agent per insect based upon the estimated population. Typical insects which can be controlled by the present invention are members of Diptera, Coleoptera, Homoptera, Hemiptera, Lepidopteran and Orthoptera such as mosquitos, aphids, beetles, moths, roaches and Graphasoma. Preferably the insect control agent is applied to the immature insect at the embryo, larvae or pupae stage. Without any intention of being bound by theory, the insect control agents of the present invention, unlike conventional insecticides, are believed to be effective control agents by disrupting normal metamorphic development resulting in abnormal development and, in some cases, sterility and inability to reproduce.

The compounds of formula A are prepared according to the following outlined synthesis:

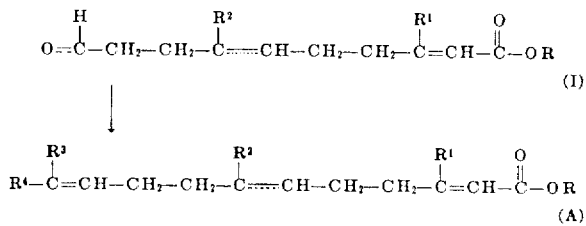

In the practice of the outlined synthesis, an aldehyde of formula I is reacted with a dialkyl lower alkylthiomethyl-phosphonate of formula II or by ylid reacting using the ylid of formula III to prepare compounds of formula A wherein $R^4$ is the group $R^5$-S-. Ph represents phenyl and R' is lower alkyl.

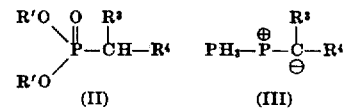

The reaction is run in the presence of base such as sodium hydride or butyl lithium.

Sulfonyl compounds of formula A ($R^4$ is $R^5$—$SO_2$—) can be prepared by oxidation of a thio compound of formula A($R^4$ is $R^5$—S—) using hydrogen peroxide, metaperiodate, or the like or directly from the aldehyde I using the appropriate phosphonate or ylid in the presence of base. Sulfinyl compounds of formula A ($R^4$ is $R^5$—SO—) can be prepared by oxidation of a thio compound of formula A using metaperiodate, hydrogen peroxide, or the like under mild conditions.

Preparation of phosphonates and phosphoranes is described by Green, *J. Chem. Soc.* (1963)1324; Popoff et al, *J. Org. Chem.* 34, No. 4, 1128(April 1969); Shahak and Almog, *Synthesis*, 170(December 1969); and Corey and Shulman *J. Org. Chem.* 35, No. 3, 777(1970). Preparation of aldehydes of formula I is described in copending application, Ser. No. 73,599, filed Sept. 18, 1970, the disclosure of which is incorporated by reference.

The following examples are provided to illustrate the present invention. Temperature is given in degrees Centigrade.

EXAMPLE 1

Diethyl methylthiomethylphosphonate (1.98 g.) and 2.27 g. of methyl 3-methyl-7-ethyl-9-carbonylnona-2,6-dienoate in ethylene glycol dimethyl ether (25 ml.) is added to a suspension of 0.5 g. of sodium hydride (50 percent in oil). The mixture is heated at 50°-60° for about 15 minutes. The solvent is removed under reduced pressure, and the concentrate taken up in ethyl acetate, washed with water, dried over magnesium sulfate and evaporated to yield methyl 3-methyl- 7-ethyl -12-thiotrideca-2,6,10-trienoate which is purified by chromatography.

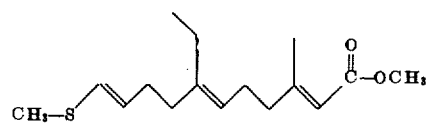

EXAMPLE 2

To sodium hydride (2.5 g. of 53.5 percent in paraffin oil), previously washed with petroleum ether suspended in 80 ml. of dry benzene is slowly added a mixture of 8.5 g. of dimethyl methylthiomethylphosphonate and 10.6 g. of methyl 9-carbonyl-3,7-dimethylnona-2,6-dienoate in 30 ml. of dry benzene with cooling. After addition is complete, the mixture is refluxed for about 30 minutes. Then, methanol is added and the mixture poured into cold water and separated. The benzene layer is washed with water, dried over magnesium sulfate and evaporated under reduced pressure to yield methyl 3,7-dimethyl-12-thio-trideca-2,6,10-trienoate which can be purified by chromatography or distillation.

The process of this example is repeated using dimethyl methylsulfonylmethylphosphonate in place of dimethyl methylthio-methylphosphonate to prepare methyl 3,7-dimethyl-12-sulfonyltri-deca-2,6,10-trienoate.

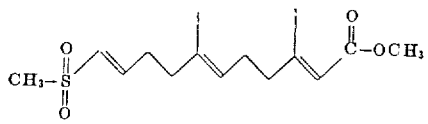

EXAMPLE 3

To 2.12 g. of diethyl (1-methylthio) ethylphosphonate in 60 ml. of dry tetrahydrofuran at −70°, under argon, is added 8 ml. of 1.25M n-butyllithium in pentane. The solution is stirred for about five hours and then 1.7 g. of methyl 9-carbonyl, 3,7-dimethylnona-2,6-dienoate in 20 ml. of dry tetrahydrofuran is added and stirring continued for about 1 hour. The reaction mixture is then heated at 50° for about 18 hours. About 50 ml. of water and about 50 ml. of saturated aqueous ammonium chloride are added followed by extraction with ether. The ethereal extracts are washed with saturated aqueous sodium bicarbonate and brine, dried over magnesium sulfate and solvent evaporated to yield methyl 3,7,11-trimethyl-12-thiotrideca-2,6,10-trienoate which can be purified by chromatography or distillation.

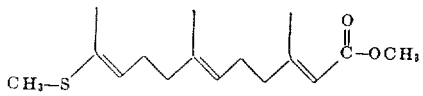

The above procedure is repeated using each of the aldehydes under column I to prepare the respective compound under column II.

COLUMN I methyl 9-carbonyl-3-methyl-7-ethylnona-2,6-dienoate
ethyl 9-carbonyl-3-methyl-7-ethylnona-2,6-dienoate
ethyl 9-carbonyl-3,7-dimethylnona-2,6-dienoate
ethyl 9-carbonyl-3,7-dimethylnon-2-enoate
methyl 9-carbonyl-3,7-dimethylnon-2-enoate
methyl 9-carbonyl-3-methyl-7-ethylnon-2-enoate
ethyl 9-carbonyl-3-methyl-7-ethylnon-2-enoate

COLUMN II methyl 3,11-dimethyl-7-ethyl-12-thiotrideca-2,6,10-trienoate
ethyl 3,11-dimethyl-7-ethyl-12-thiotrideca-2,6,10-trienoate
ethyl 3,7,11-trimethyl-12-thiotrideca-2,6,10-trienoate
ethyl 3,7,11-trimethyl-12-thiotrideca-2,10-dienoate
methyl 3,7,11-trimethyl-12-thiotrideca-2,10-dienoate
methyl 3,11-dimethyl-7-ethyl-12-thiotrideca-2,10-dienoate
ethyl 3,11-dimethyl-7-ethyl-12-thiotrideca-2,10-dienoate

EXAMPLE 4

To 0.11 mol of sodium hydride in 100 ml. of ether is added slowly 0.10 mol of diethyl ethylsulfonylmethylphosphonate, with stirring, at about 25°. After about one-half hour, 0.11 mol of methyl 9-carbonyl-3,7-dimethylnona-2,6-dienoate in ether is added slowly, with stirring, at about 25°. After addition is complete, the mixture is stirred at 25° − 35° for about 2 hours. Then the mixture is poured into water and extracted with ether. The ethereal extract is washed, dried over magnesium sulfate and solvent evaporated under reduced pressure to give methyl 3,7-dimethyl-12-sulfonyltetradeca-2,6,10-trienoate which can be purified by chromatography.

By using diethyl (1-methylsulfonyl) ethylphosphonate in the foregoing procedure in place of diethyl ethylsulfonyl-methylphosphonate, there is prepared methyl 3,7,11-trimethyl-12-sulfonyltrideca-2,6,10-trienoate.

EXAMPLE 5

To 210 ml. of a 0.5M solution of sodium metaperiodate (aqueous methanol 1/1) at 0° is added 0.1 mole of methyl 3,7,11-trimethyl-12-thiotrideca-2,6,10-trienoate. The mixture is stirred at 0° for 4 hours and then filtered. The filtrate is diluted with water and then extracted with chloroform. The extract is dried over magnesium sulfate and solvent removed by evaporation under reduced, pressure to yield methyl 3,7,11-trimethyl-12-sulfinyltrideca-2,6,10-trienoate which can be purified by chromatography.

Using the above procedure, the compounds of formula A wherein $R^4$ is $R^5$ - SO - are prepared.

EXAMPLE 6

To 200 ml. of aqueous methanol (1/1) containing 0.2 mol of sodium metaperiodate is added 0.1 mol of methyl 3,7,11-trimethyl-12-thiotrideca-2,6-10-trienoate. The mixture is maintained at about 30° for 6 hours. After cooling, the mixture is filtered and the filtrate diluted with water and then extracted with chloroform. The extract is dried over magnesium sulfate and evaporated to give methyl 3,7,11-trimethyl-12-sulfonyltrideca-2,6,10-trienoate which can be purified by chromatography.

Using the above procedure, other compounds of formula A wherein $R^4$ is $R^5$ - $SO_2$ - are prepared.

EXAMPLE 7

A suspension of 0.5 g. of 5 percent palladium-on-carbon catalyst in 50 ml. of ethanol is hydrogenated for 30 minutes. A solution of 2.0 g. of methyl 9-carbonyl-3,7dimethylnona-2,6-dienoate in 100 ml. of ethanol is added and hydrogenated with agitation until the theoretical amount of hydrogen has been absorbed. The catalyst is then removed by filtration and the solution is evaporated to yield methyl 9-carbonyl-3,7,-dimethylnon-2-enoate.

EXAMPLE 8

A mixture of 1.0 g. of methyl 3,7,11-trimethyl-12-thiotrideca-2,6,10-trienoate, 60 ml. of slightly aqueous methanol and 2 ml. of 50 percent aqueous sodium hydroxide is allowed to stand overnight at room temperature. The mixture is then concentrated under vacuum, acidified by addition of aqueous oxalic acid and immediately extracted with ether. The ether extract is washed with water, dried and evaporated to yield 3,7,11-trimethyl-12-thiotrideca-2,6,10-trienoic acid.

What is claimed is:

1. A compound selected from those of the following formula (A):

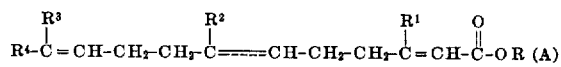

wherein, R is hydrogen, lower alkyl, cycloalkyl, aralkyl or aryl; each of $R^1$ and $R^2$ is lower alkyl; $R^3$ is hydrogen or lower alkyl; $R^4$ is one of the groups

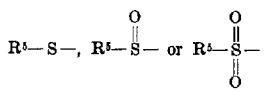

in which $R^5$ is lower alkyl; and the broken line indicates the presence or absence of a carbon-carbon bond.

2. A compound according to claim 1 wherein each of $R^1$ and $R^2$ is methyl or ethyl.

3. A compound according to claim 2 wherein $R^4$ is the group $R^5$ - S - and $R^1$ is methyl.

4. A compound according to claim 3 wherein $R^5$ is methyl or ethyl and the broken line is a carbon-carbon bond.

5. A compound according to claim 4 wherein $R^3$ is methyl.

6. A compound according to claim 4 wherein $R^3$ is hydrogen.

7. A compound according to claim 5 wherein R is methyl or ethyl.

8. A compound according to claim 6 wherein R is methyl or ethyl.

9. A compound according to claim 2 wherein $R^4$ is the group

$R^3$ is methyl or hydrogen, $R^1$ is methyl; R is methyl or ethyl, and $R^5$ is methyl or ethyl.

10. A compound according to claim 9 wherein the broken line is a carbon-carbon bond.

11. A compound according to claim 2 wherein $R^4$ is the group $R^5$ - $SO_2$- in which $R^5$ is methyl or ethyl; $R^1$ is methyl; R is methyl or ethyl and $R^3$ is methyl or hydrogen.

12. A compound according to claim 11 wherein the broken line is a carbon-carbon bond.

13. A compound according to claim 3 wherein $R^5$ is methyl or ethyl; $R^3$ is methyl or hydrogen; R is methyl or ethyl; and the broken line represents the absence of a carbon-carbon bond.

* * * * *